June 15, 1971  H. P. VROOMAN, JR  3,584,407
LICENSE PLATE FRAME
Filed Dec. 16, 1969
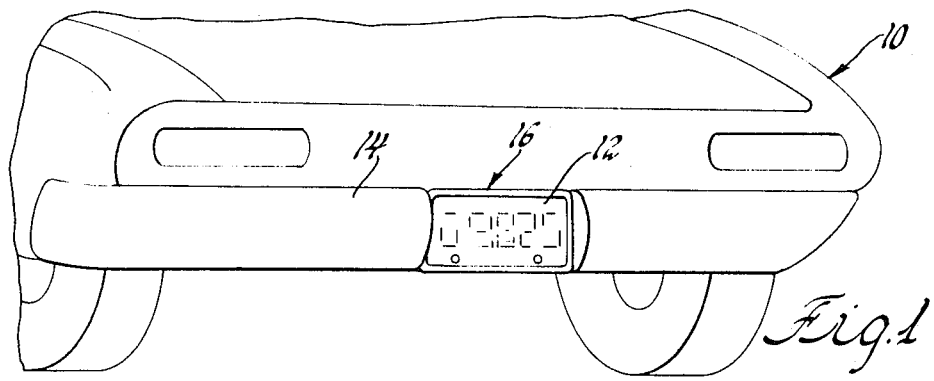
Fig. 1
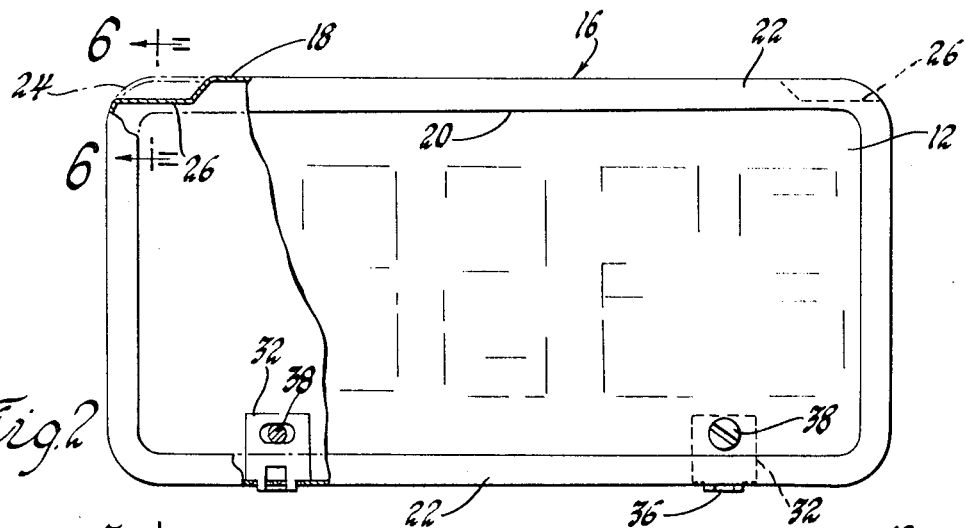
Fig. 2
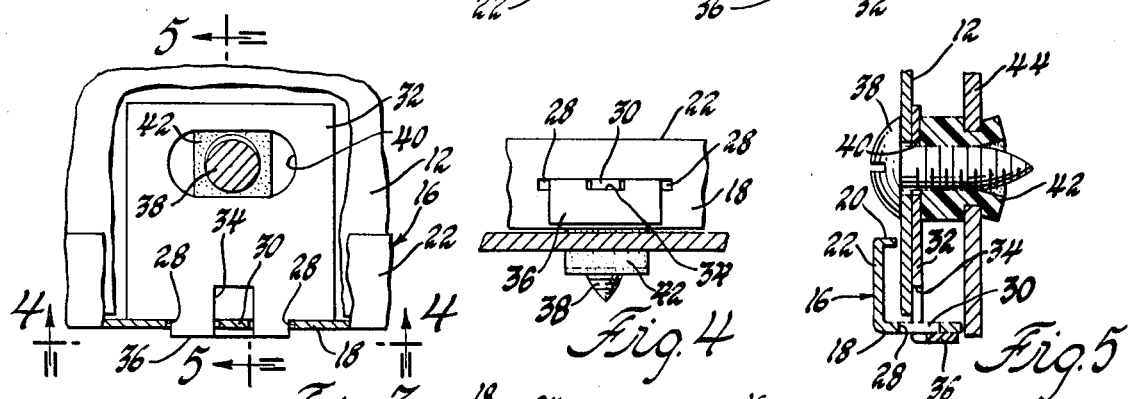
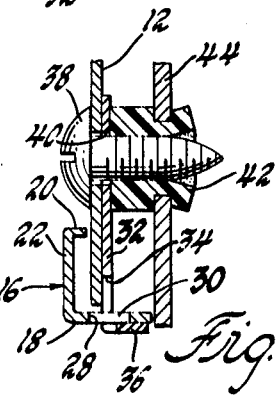
Fig. 3   Fig. 4   Fig. 5
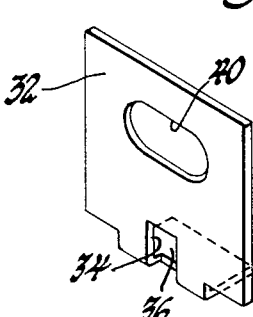
Fig. 8
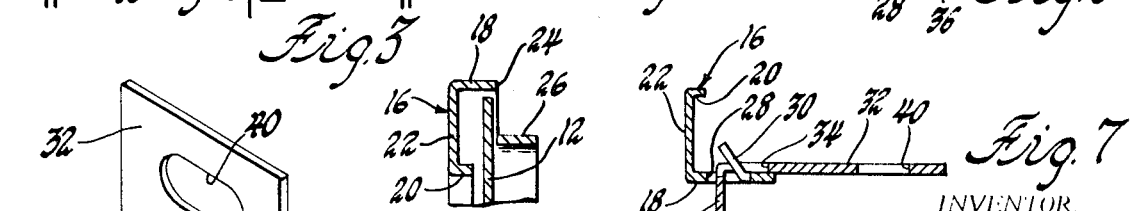
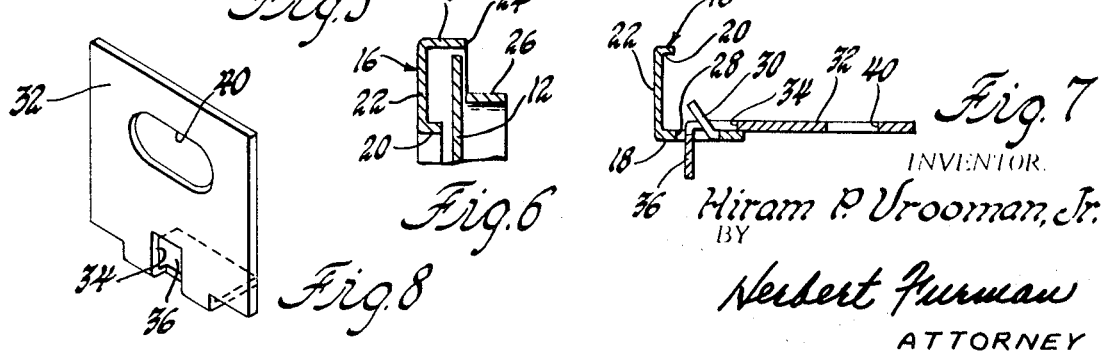
Fig. 6   Fig. 7
INVENTOR.
Hiram P. Vrooman, Jr.
BY
Herbert Furman
ATTORNEY United States Patent Office 3,584,407
Patented June 15, 1971

3,584,407
LICENSE PLATE FRAME
Hiram P. Vrooman, Jr., Pontiac, Mich., assignor to
General Motors Corporation, Detroit, Mich.
Filed Dec. 16, 1969, Ser. No. 885,414
Int. Cl. G09f 7/00
U.S. Cl. 40—209
3 Claims

ABSTRACT OF THE DISCLOSURE

A license plate frame is of generally U-shaped cross section and shaped to receive the license plate. The outer peripheral wall of the frame at two corners is longitudinally lanced and the resulting integral strap portions bent inwardly to overlie the inner surface of the plate and hold the outer surface against the inner peripheral wall of the frame, which is of less depth than the outer wall. Rotatable tabs located generally opposite the bent-in portions can be swung inwardly of the frame and against the rear surface of the license plate to hold the license plate within the frame. A common fastener extends through the license plate, each tab, and through a conventional vehicle body panel to secure the license plate and frame to each other as a unit and mount the resultant unit on the vehicle body.

---

This invention relates to license plate frames and more particularly to a license plate frame which can be releasably preassembled with a license plate to form a unit mountable on a vehicle body by mounting means which also secure the frame and plate to each other.

License plate frames are conventionally used to enhance the appearance of the vehicle. Such frames usually can only be preassembled with license plates if fasteners are used. Additional fasteners are then required to mount the license plate and frame on the body.

The frame of this invention can be easily preassembled with the license plate without the use of any fasteners. The resultant unit can then be mounted on the body by conventional fasteners which also serve to secure the frame to the plate.

In the preferred embodiment of the invention, the frame conforms to the general shape of the plate and is of generally channel-shaped cross section. The inner wall is of less depth than the outer wall and engages the outer surface of the plate adjacent the edge of the plate. The outer wall of the frame is slotted or lanced at one or more locations to form integral straps which are depressed inwardly of the frame. One or more tabs are rotatably mounted to the outer wall opposite the straps for movement between a first position in general extension of the outer wall and a second position against the back of the plate after the plate has been slipped transverse of the inner wall and under the straps and fitted into the frame. Conventional studs then extend through the apertures in the plate, the tabs, and in the body bracket to mount the assembly or unit on the body and fixedly secure the frame to the plate.

The primary object of this invention is to provide an improved license plate frame which can be releasably assembled to a license plate without fasteners to form a unit, with the unit being mountable on a vehicle body by conventional mounting means which also fixedly secures the frame and plate to each other.

This and other objects of the invention will be readily apparent from the following specification and drawings wherein:

FIG. 1 is a partial rear perspective view of a vehicle body having a license plate frame according to this invention mounted thereon;

FIG. 2 is an enlarged partially broken away view of a portion of FIG. 1;

FIG. 3 is an enlarged view of a portion of FIG. 2;

FIG. 4 is a view taken generally along the plane indicated by line 4—4 of FIG. 3;

FIG. 5 is a view taken generally along the plane indicated by line 5—5 of FIG. 3;

FIG. 6 is an enlarged sectional view taken generally along the plane indicated by line 6—6 of FIG. 2;

FIG. 7 is a view showing the assembly of the tabs to the frame; and

FIG. 8 is a perspective view of one of the tabs.

Referring now to FIG. 1 of the drawings, a vehicle body designated generally 10 includes a rear license plate 12 of generally rectangular shape which is mounted within a recess of the bumper 14 of the body 10 by a license plate frame 16 according to this invention.

The license plate frame 16 is generally of rectangular shape since it must conform to the shape of the license plate 12. The frame 16 is of channel or U-shaped cross section and includes an outer continuous peripheral wall 18, an inner continuous peripheral wall 20 of less depth than the wall 18, and a continuous base or front wall 22. The wall 18, at the upper corners of the frame 16, is lanced or slotted at 24, FIG. 6, to form strap portions 26 which are depressed or bent inwardly, and cooperate with the wall 20 to provide releasable means for holding the upper corners of the license plate 12 to the frame 16 as will be described.

The wall 18, opposite the strap portions 26 is provided with two spaced pairs of rectangular slots 28, each pair being separated by a bendable tab 30. A generally L-shaped member or tab 32 is rotatably assembled to each tab 30. An L-shaped slot or aperture 34 is formed in the shorter leg 36 of each tab and a portion of the longer leg thereof as best shown in FIG. 8.

When the frame 16 is formed, the tabs 30 are bent, as shown in FIG. 7. Thereafter the tabs 32 are assembled to the frame 16, as shown in FIG. 7, with the tabs 30 extending through the apertures 34. The tabs 30 are then bent downwardly, as viewed in FIG. 7, to their position as shown in FIGS. 3, 4 and 5, in general alignment with the wall 18 to rotatably mount the tabs 32 to the frame 16.

In order to assemble the license plate 12 to the frame 16, both tabs 32 are rotated to the position shown in FIG. 7 in general extension of wall 18. The license plate 12 is then angularly inserted in the frame to position the corners thereof underneath the strap portions 26, and then moved fully within the frame 16 in engagement with the free edge of the inner wall 20. The tabs 32 are then swung to their position as shown in FIGS. 3 and 5 in engagement with the rear wall or surface of the plate 12. The license plate and frame are thus releasably preassembled as a unit without the use of any fasteners.

To mount this unit on the bumper 14, conventional fasteners 38 are inserted through the apertures conventionally provided in the license plate and through apertures 40 of tabs 32. The fasteners 38 are then threaded into conventional expandable plastic nuts 42 which fit within apertures in a wall or flange 44 of the bumper 14 to mount the assembly on the vehicle body and also fix or secure the frame 16 and the license plate 12 to each other.

Thus, this invention provides an improved license plate frame.

What is claimed is:

1. In combination with a license plate, a license plate frame comprising, a continuous loop-type frame member of generally U-shaped cross section having inner and outer peripheral walls, the inner peripheral wall being of less depth than the outer peripheral wall and adapted to engage the front surface of the license plate adjacent the edge thereof, the outer peripheral wall being shaped to receive the license plate therewithin and including at least one integral strap portion pressed from the normal contour thereof and adapted to overlie the rear surface of the license plate adjacent the edge thereof to hold the front surface of the license plate in engagement with the inner peripheral wall, at least one rotatable member rotatably mounted on the outer peripheral wall in spaced relationship to the strap portion, the rotatable member being movable between a first position in general extension of the outer peripheral wall permitting insertion of the license plate under the integral strap portion and positioning of the license plate within the frame, and a second position transverse of the outer peripheral wall in engagement with the inner surface of the license plate adjacent the edge thereof, and common securement means securing the rotatable member and the license plate to each other and adapted to be releasably engaged with a vehicle body member to mount the frame and license plate assembly on a vehicle body.

2. In combination with a license plate, a license plate frame comprising, a continuous loop-type frame member of generally U-shaped cross section having inner and outer peripheral walls, the inner peripheral wall being of less depth than the outer peripheral wall and adapted to engage the front surface of the license plate adjacent the edge thereof, the outer peripheral wall being shaped to receive the license plate therewithin and including at least one integral strap portion pressed from the normal contour thereof and adapted to overlie the rear surface of the license plate adjacent the edge thereof to hold the front surface of the license plate in engagement with the inner peripheral wall, at least one rotatable member, cooperating slot and tab means on the rotatable member and outer peripheral wall rotatably mounting the rotatable member on the outer peripheral wall in spaced relationship to the strap portion, the rotatable member being movable between a first position in general extension of the outer peripheral wall permitting insertion of the license plate under the integral strap portion and positioning of the license plate within the frame, and a second position transverse of the outer peripheral wall in engagement with the inner surface of the license plate adjacent the edge thereof, and common securement means securing the rotatable member and the license plate to each other and adapted to be releasably engaged with a vehicle body member to mount the frame and license plate assembly on a vehicle body.

3. In combination with a license plate, a license plate frame comprising, a continuous loop-type frame member of generally U-shaped cross section having inner and outer peripheral walls, the inner peripheral wall being of less depth than the outer peripheral wall and adapted to engage the front surface of the license plate adjacent the edge thereof, the outer peripheral wall being shaped to receive the license plate therewithin and including a plurality of integral strap portions pressed from the normal contour thereof and adapted to overlie the rear surface of the license plate adjacent the edge thereof to hold the front surface of the license plate in engagement with the inner peripheral wall, plurality of retaining members, the outer peripheral wall having a plurality of closed slots therein each slot receiving a respective retaining member therethrough, each slot being traversed by a tab normally offset from the outer peripheral wall and being movable through the slot of the respective retaining member to rotatably mount the retaining member on the outer wall for movement between a first position in general extension of the outer peripheral wall permitting insertion of the licensed plate under the integral strap portion and positioning of the license plate within the frame, and a second position transverse of the outer peripheral wall in engagement with the inner surface of the license plate adjacent the edge thereof, and common securement means securing each retaining member and the license plate to each other and adapted to be releasably engaged with a vehicle body member to mount the frame and license plate assembly on a vehicle body.

References Cited
UNITED STATES PATENTS

| | | | |
|---|---|---|---|
| 1,752,080 | 3/1930 | Hedglon | 40—209 |
| 2,758,400 | 8/1956 | Shuff | 40—209 |
| 2,815,598 | 12/1957 | Gazan | 40—209 |
| 3,423,866 | 1/1969 | Bott | 40—209 |

ROBERT W. MICHELL, Primary Examiner

W. J. CONTRERAS, Assistant Examiner

U.S. Cl. X.R.

44—10